Aug. 5, 1969 A. J. SEVENCO 3,459,920
DIP TRANSFER WELDING METHOD AND APPARATUS
Filed March 10, 1966 3 Sheets-Sheet 1
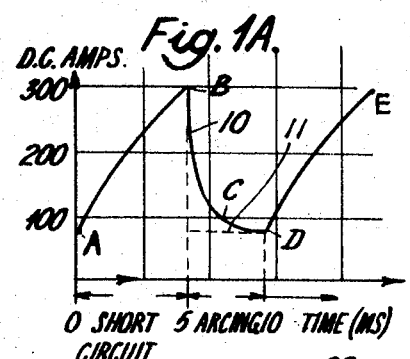
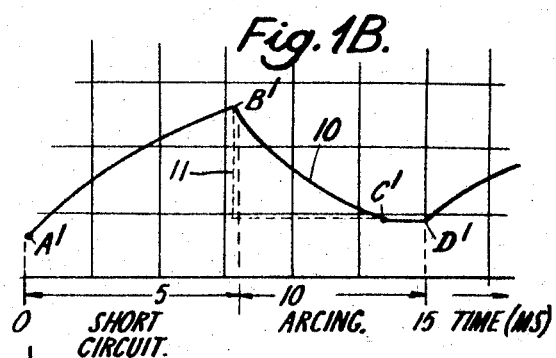
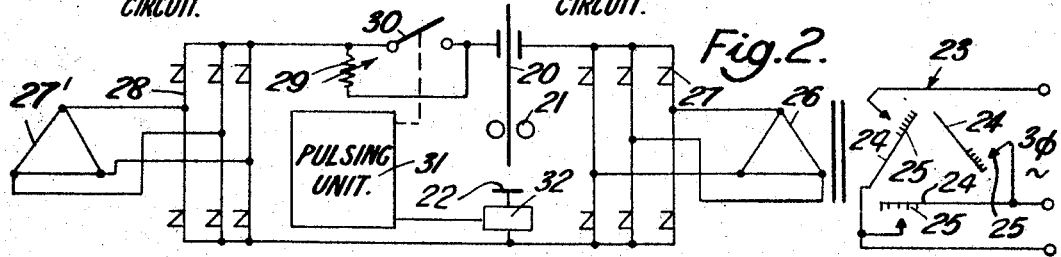
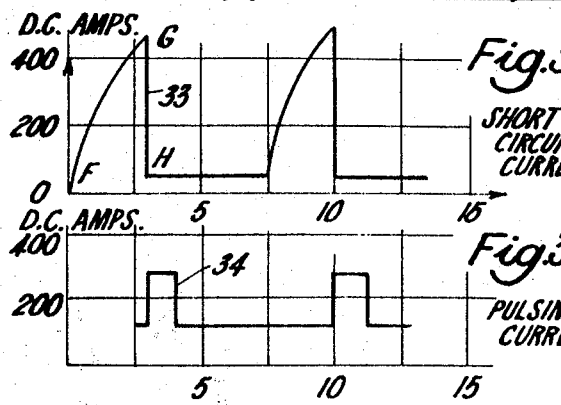
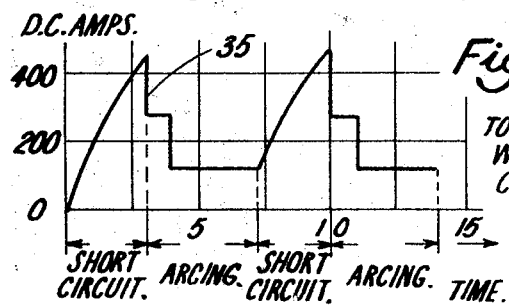
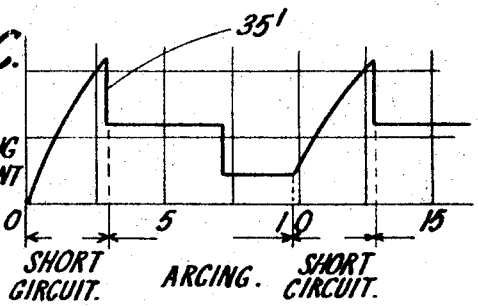
A. J. Sevenco
INVENTOR
Watson, Cole, Grindle + Watson
ATTORNEYS United States Patent Office 3,459,920
Patented Aug. 5, 1969

3,459,920
DIP TRANSFER WELDING METHOD AND APPARATUS
Alexander Jura Sevenco, Burlington, Ontario, Canada, assignor to Lincoln Electric Company Limited, Welwyn Garden City, England, a British company
Filed Mar. 10, 1966, Ser. No. 533,318
Claims priority, application Great Britain, Mar. 11, 1965, 10,438/65
Int. Cl. B23k 9/10
U.S. Cl. 219—131   8 Claims

ABSTRACT OF THE DISCLOSURE

A control circuit for dip transfer welding includes two current sources connected to a consumable electrode. One of the current sources continuously supplies current to the electrode and the other source supplies a pulse of current at the end of each short circuit period. A switching device, preferably a solid state switch, is used to control the operation of the current pulse source. A sensing device is connected in the welding circuit to sense the point at which the electrode tip melts off causing an arc to be struck. A trigger circuit having a variable time delay means is activated by the sensing means upon the striking of the arc which then activates the switch at the end of the period of delay. This allows for different current characteristics to be selected for consumable electrodes of different compositions and properties.

---

This invention relates to apparatus for use in electric arc welding and more particularly in dip transfer welding, that is to say, a welding process in which a consumable electrode is continually fed to the work, the welding operation being carried on in a repetitive cycle in which the electrode first contacts the work or dips into a weld pool thereby producing an electrical short circuit which melts the end of the electrode to form a droplet which is transferred to the work, the transfer being accompanied by the formation of an arc between the electrode and the work as the weld pool and the arc continuing until the electrode is again advanced into contact with the work or weld pool. The frequency of the cycle is known as the "droplet rate."

Very typically, the arc may be shielded by a suitable inert gas, such as argon or by other gases such as carbon dioxide or suitable gas mixtures.

In dip transfer welding, there are two distinct periods of the welding cycle known respectively as the "period of short circuit" and "the period of arcing" and because the electrical resistance between the electrode and the work is very different in the two periods, the welding current varies in a cycle with two substantially distinct periods of currents known as the period of "short circuit current" and the period of "arcing current," respectively.

For many welding operations, it is desirable that the shape of the current curve during the period of arcing current should be adjustable to enable the correct characteristic to be selected for consumable electrodes of different composition and properties. When different types of consumable electrodes are used with conventional power sources welds may differ in appearance owing to differences in the welding and transfer properties of the materials used. However, if the characteristics of the arcing current can be varied to suit the consumable electrodes being used, then welds of similar appearance may be obtained despite the use of different materials for the consumable electrode in the same welding operation. Furthermore, the control of the arcing current is desirable in order that a greater degree of control over the weld penetration and shape may be exerted. A greater degree of control of the arcing current may also lead to a lowering of losses due to spatter during the period of arcing current. In dip transfer welding apparatus, power for the currents to be passed through a welding head is usually derived from a source of relatively constant potential and hitherto it has often been the practice to connect a tapped or variable inductance choke in the main welding circuit so as to vary the rate of current rise on short circuit. The choke may store energy during the period of short circuit and, on the creation of an arc, release the stored magnetic energy into the arc, thereby preheating and melting the tip of the electrode wire before the next short circuit. However, use of a choke of this kind has the main disadvantage that an increase of inductance, which would normally be desirable so as to store as much magnetic energy as possible in the inductor during the period of short circuit, causes a decrease in the rate of current rise on short circuit as well as in the rate of decay of arcing current which is not separately controlled from the rate of rise; whereas, in dip transfer welding it is important that very high current magnitudes should be reached in a very short time. The present invention is directed to an improved method of controlling the arc current in dip transfer welding apparatus.

According to this invention, in welding apparatus for use in dip transfer welding and having means for supplying welding current to a welding head, there are provided means operative when the short circuit current ceases to flow and arranged to inject a pulse of current into the main arcing current. With this construction the magnitude and duration of the pulse supplied to the work, so as to control, for example, the appearance of the weld, may be varied in conditions when the short circuit current has ceased to flow and consequently there is no coupling between the pulse injection means and the short circuit current supply means. The preheating and melting of the work in preparation for a subsequent period of welding may thus be carried out without affecting the formation of a droplet in any way. Furthermore, it is possible to inject the pulse so that an initial rapid rate of decay of arcing current is achieved which rate would not normally occur because of the high resistance of the gap between the electrode and the workpiece on arcing, and so that the current subsequent to the initial rapid rate of decay is substantially constant for the duration of the pulse.

The pulse injection means may be adjustable such that the magnitude and/or the duration of the pulse injected into the welding circuit are adjustable independently. This facilitates the choice of pulse amplitude and duration which are most suitable for the materials which constitute the electrode and workpiece.

As has been mentioned above, the pulse injection means may be operative when the short circuit current ceases to flow, and to facilitate this operation there may be means, preferably located in the path of current through the welding head, responsive to the current through the welding head and arranged to operate said pulse injection means when the short circuit current ceases to flow. It would, for example, be possible to provide a differentiating circuit which would provide a short pulse output when the slope of welding current changed polarity, this occurring for example, when the short circuit current reaches its maximum value at which the electrode melts thus cutting off the short circuit current.

The short circuit current and the pulsed current may be supplied with power from different sources, either or both of which may be a source of relatively constant potential. With such a source the rate of current rise on short circuit, for example, depends on the ratio of the resistance to the inductance of the welding circuit and by altering the inductance using, for example, a flux reset transducer, it is possible to vary the rate of current rise on short circuit so as to control the droplet rate and the stability of droplet frequency. Such a flux reset transductor may comprise a magnetic current core having a load winding and a reset control winding each with a half-wave rectifying circuit so that the current flow is limited to one direction only during every cycle of supply frequency. Each winding and half-wave rectifying circuit would be supplied with alternating voltage, the two voltages being in anti-phase. The magnetomotive force produced by the reset winding would determine the flux density in the core and therefore the voltage drop across the load-winding during a half-cycle of supply frequency subsequent to a half-cycle when load winding current flows. Such a flux to reset transductor arrangement is more fully described in our co-pending U.S. application Ser. No. 467,448. In place of such a transducer it would be possible to supply current on both short circuit and arcing via a uni-directionally conducting switch or controlled rectifier such as, for example, a thyristor, and in the case of the arcing current supply it would be convenient to control the controlled rectifier from the means responsive to the current through the welding head, so that a pulse of current may be passed by the rectifier as soon as the short circuit current ceaess to flow. Alternatively, a rectifier may be used in series with a controlled switch.

This invention also provides a method of dip transfer welding, comprising feeding welding current to a workpiece through a consumable electrode which is continually fed towards the workpiece, detecting the end of each period of short circuit current and thereafter feeding a pulse of current to the weld at the beginning of each period of arcing current.

The invention and some examples thereof will now be more particularly described by way of example, reference being made to the accompanying drawings in which:

FIGURE 1A illustrates a dip transfer welding current waveform obtained with a conventional constant potential power source with a small inductance in the welding circuit;

FIGURE 1B illustrates a typical current waveform as in FIGURE 1A but wherein a larger inductance is used in the welding circuit;

FIGURE 2 is a diagram illustrating one form of dip transfer welding apparatus according to this invention;

FIGURE 3A illustrates a typical short circuit current wavefom obtained using the apparatus of FIGURE 2;

FIGURE 3B illustrates the arcing current waveform obtained with the apparatus of FIGURE 2;

FIGURE 3C illustrates the total welding current obtained from the apparatus of FIGURE 2; being the waveforms of FIGURES 3A and 3B combined;

Figure 4:
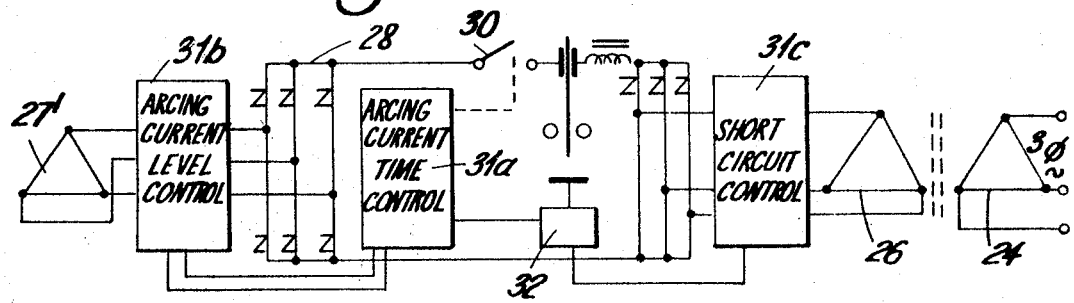
FIGURE 4 is a diagram illustrating another form of dip transfer welding apparatus according to this invention.
Figure 6A:
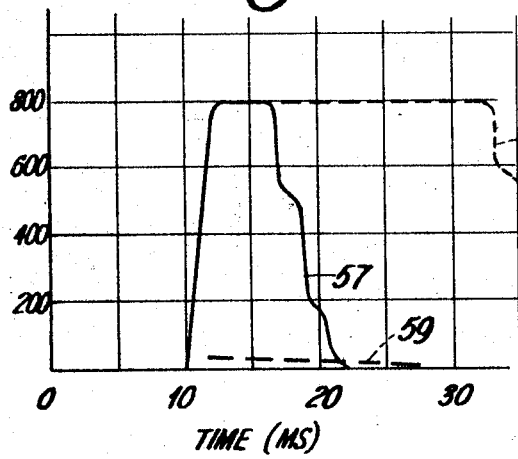
Figure 6B:
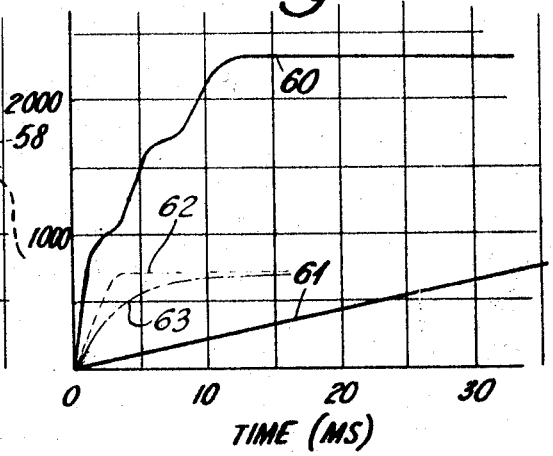
Figure 7:
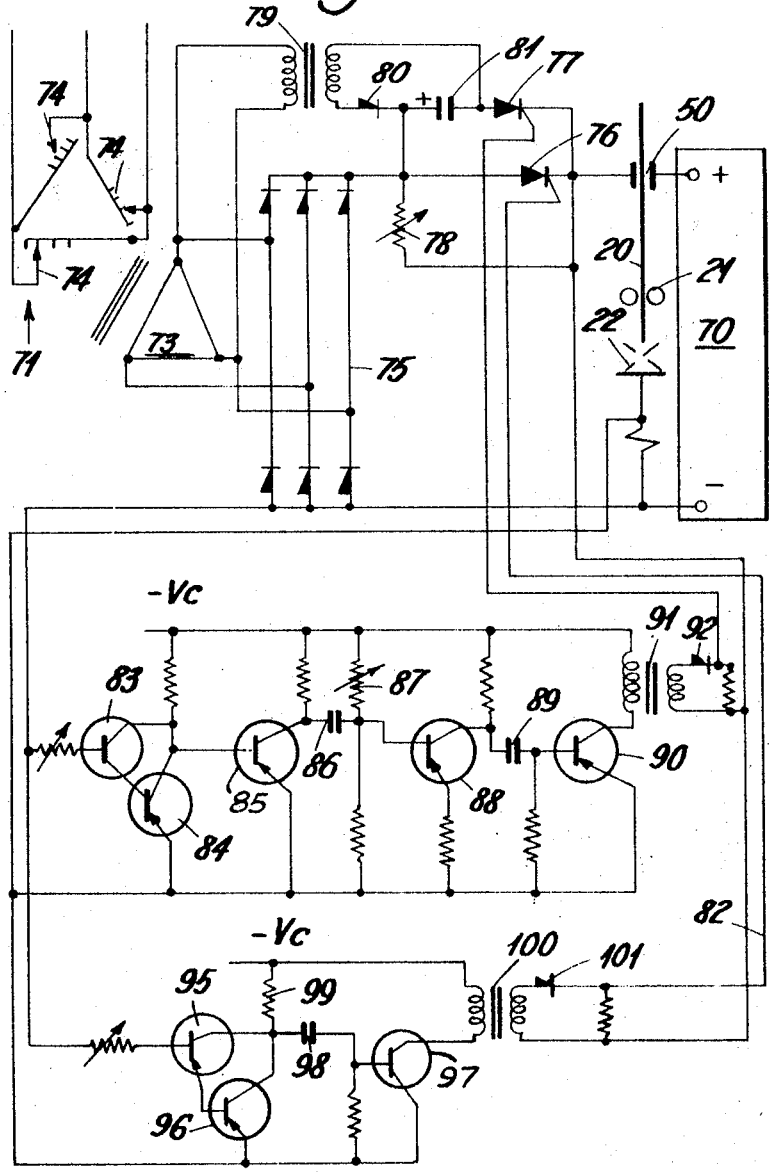

FIGURES 6A and 6B ilustrate the dynamic characteristics preferred for the circuit of FIGURE 4; and FIGURE 7 shows one example of an arcing current pulsing circuit.

Referring to FIGURE 1: the curve 10 shows a typical current waveform through the welding head obtained from a source of constant potential at a particular voltage setting. On short circuit, the current increases as is shown by the portion between A and B of the curve 10 to a typical maximum value of the order of 300 amperes at which point the electrode melts, forming a droplet. the arcing current would, if no inductance were used in the circuit, approximately follow the curve 11 down to the typical quiescent value of approximately 60 amps but due to the large inductance in the circuit the arcing current follows the curve 10 between B and C, the time constant of the portions of A to B and B to C being in the same proportion as the respective resistances on short circuit and arcing respectively. When the value of arcing current reaches the quiescent value at C the arcing current continues at the same value for a short while, corresponding to the period when the electrode is being moved nearer the work. On subsequent short circuit the value of the current again increases, in accordane with the portion of the curve 10 between D and E. FIGURE 1B shows the same system, having a substantially larger inductance in the circuit and it will be seen that due to the increase of inductance the time constant of the circuit is increased so that the short circuit current takes considerably longer to reach its maximum value, the portion A'B' being longer than the portion AB of FIGURE 1A. The portion B'C' is likewise of longer duration than the corresponding portion BC in FIGURE 1A. This, of course, limits the frequency of the droplet rate.

Referring now to FIGURE 2, an electric arc welding arrangement is shown diagrammatically, an electrode 20 being moved repetitively by a pair of rollers 21 towards a workpiece 22. Welding current is passed through the welding head, constituted by the electrode 20 and the workpiece 22, from a conventional constant potential power source consisting of a three-phase transformer 23, having primary windings 24 with votage tappings 25, secondary windings 26 and a three-phase bridge rectifier 27. It would be possible to operate on other multi-phase supplies or from a single phase supply if desired. This short circuit supply unit is of low inductance and the short circuit waveform obtained will have a very short time constant. An arc pulsing consists of a further secondary winding 27' on the transformer 23, a further three-phase bridge rectifier 28, one terminal of which is connected to the electrode 20 through the parallel arrangement formed by the variable resistor 29 and a fast acting switch 30. The switch is operated by a control unit 31 which is triggered in its turn by a current responsive switch 32 arranged in the path of the current through the welding head.

The operation of this circuit will be described with reference to FIGURES 3A, 3B and 3C and is as follows:

On short circuit, the short circuit unit will supply substantially all the current to the welding head, the rate of rise of the short circuit current being dependent only on the very small inductance in this welding circuit. When the electrode tip melts, the short circuit current will decay very rapidly to a small value. This rapid change is sensed by the sensing unit 32 which signals the control unit 31, which provides an output to close the switch 30, thus connecting the arcing current unit to the welding head. A pulse of current is injected into the arc from the output of the transformer winding 27 through the bridge rectifier 28. The control unit 31 is arranged to provide a further signal opening the switch 30 after a preselected time whereupon the arcing current decays to the value allowed to it, at a rate dependent upon the setting of the resistor 29 and the inductance in the circuit. In this simple circuit, the value of the arcing current pulse is constant but could be made to vary if the supply of the voltage to the rectifier unit 28 were made variable.

Referring to FIGURES 3A, 3B and 3C, FIGURE 3A shows the value of the current supplied by the short circuiting unit for two values of supply frequency and arcing pulse length. It will be seen that after the period of short circuit, shown by the portions F to G of curve 33 and 33', there is a very rapid decay of current when arcing commences, shown by the portions G to H of the curve 33, the respective value of the time constants on short circuit and arcing being in the ratio of the resistances of the circuit in the two conditions. FIGURE 3B shows the pulse current curve 34 and curve 34' obtained from the arcing unit and FIGURE 3C, curve 35 or curve 35' shows the combined value of the current through the welding head due to the short circuit unit's current and the arc pulsing unit's current combined. There is an initial very rapid rate of decay of current on arcing which is followed by a period of substantially constant current, followed by a further rapid decay to the quiescent value of arcing current until the next period of short circuit.

Figure 5A:
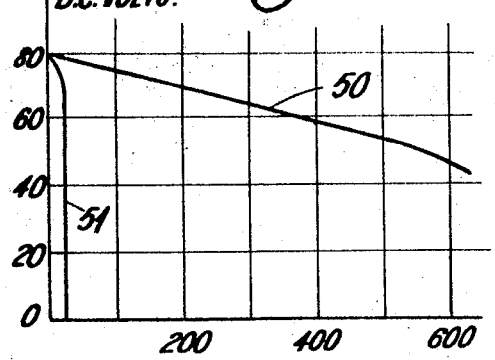
FIGURE 5A and FIGURE 5B illustrate the preferred static characteristics for the circuit of FIGURE 4.
Figure 5B:
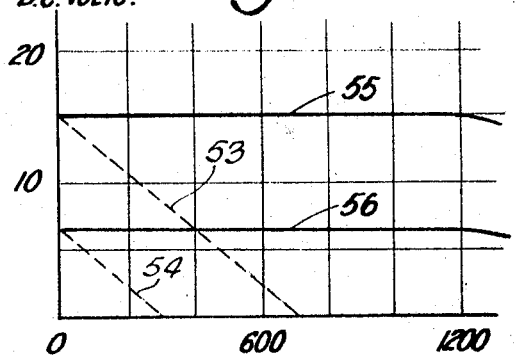

Referring now to FIGURE 4, the circuit shown is generally similar to that of FIGURE 2 with the difference that the control unit 31a is arranged to control the switch connecting the arc pulsing unit's source of power to the welding head and control 31b is arranged to control the level of arcing current; the current sensing device 32 is shown as controlling the short circuit control 31c. In FIGURE 7, the connection between the control unit 31a and the switch 30 is described in more detail, but before that description is made FIGURES 5A to 6B will be referred to in order to describe the desired characteristics required of the system of FIGURE 4. In FIGURE 5A is shown the static characteristic of the arcing pulse unit, the curve 50 being the upper limits of power available, being substantially linear over a portion corresponding to 80 volts and zero amps to 45 volts and 500 amps, the value of current and voltage being quoted by way of example. The curve 51 shows the lower limit curve stretching from the same value of D.C. volts to zero volts and 10 amps respectively. In FIGURE 5B is shown the characteristics of the short circuit unit, the curves of 53 and 54 showing the power range available from conventional units, the maximum value of power being typically 600 amps at 15 volts. With the short circuit unit of the present invention, a substantially horizontal characteristic of power against voltage may be obtained as shown by the curves 55 and 56.

FIGURE 6A shows the preferred dynamic characteristics required by the arc pulsing unit. The pulse may be delayed for a period, which may be adjustable between zero and 10 milliseconds; and has a short rise time of the order of 1–2 milliseconds. The period of the pulse should be variable at maximum output between 7–10 milliseconds and 30–40 milliseconds, as illustrated by the curves 57 and 58 respectively. The magnitude of the pulse should be variable from the maximum value, typically 800 amperes, to substantially zero amperes, the latter being shown by the curve 59.

FIGURE 6B shows the preferred characteristics of the short circuit current unit, the curve 60 showing the fastest response, maximum current being reached in a time of the order of 10 milliseconds, and curve 61 showing the slowest response. Curves 62 and 63 show respectively the fastest and slowest obtainable responses using previously known apparatus.

FIGURE 7 shows, in more detail, the circuits of the arc pulsing unit which have been generally described with reference to FIGURE 2. In the figure, which refer to the modification of FIGURE 2, as shown in FIGURE 4, the short circuit pulsing unit has been omitted, being generally denoted by the schematic block 70. Power is obtained for the arc pulsing unit from the transformer 71 having a primary winding with arc voltage control tappings 74 and secondary windings 73. The output of the transformer is passed through the three-phase rectifier 75. The rectifiers could be of the controlled rectifier type as described in our co-pending U.S. application Ser. No. 467,448. The output from the rectifier unit is fed to the electrode 20 and the controlled rectifier 76, which is shunted by the variable resistor 78. An auxiliary switch-off circuit consisting of the auxiliary transformer 79 connected across one phase of the secondary winding 73 and having across its secondary winding a diode 80 in series with a capacitor 81, the output across the capacitor being in parallel with the controlled rectifier 77 and the controlled rectifier 76. The transformer 79 and rectifier 80 could also be three-phase connected. This circuit assists in switching off the main control rectifier 76. The firing and delay unit 82 which is to provide a delay for the arc pulsing unit is operated as follows:

At the instant of the electrode wire tip melting in short circuit the short circuit current will decay rapidly and the composite transistor pair 95 and 96 will switch-off allowing transistor 97 to switch on during the time that capacitor 98 takes to charge from the voltage through the resistor 99. A current change will occur in the primary winding of transformer 100 which will cause a voltage wave to appear, at the gate of the controlled rectifier 76, switching the rectifier on. Arcing voltage and hence arcing current will be pulsed to a high value depending on the setting of the tapping switches 74. At the same time that the transistor pair 95 and 96 switch off, the transistor pair 83, 84 will switch off and transistor 85 will switch on for the time delay imposed by the charging of capacitor 86 through the resistor 87 from the potential −Vc and the transistor 88 will switch off for the same time. The discharge of capacitor 89, which is caused when transistor 88 switches off, causes transistor 90 to switch on momentarily producing at the collector of that transistor a current change through the primary winding of transformer 91. The resultant voltage developed across the secondary winding is fed via the diode 92 to the gate of the controlled rectifier 77. This will switch on the rectifier, applying the voltage of the capacitor 81 in reverse to that already existing on the controlled rectifier 76, and this voltage, which is arranged to be greater than the first voltage which is supplied through rectifier 75, will switch off the controlled rectifier 76. The working current will, therefore, decay to the value preselected by the resistor 78. The operation of the controlled rectifier 76 and the control therefor would be similarly applied in the circuits of FIGURE 2 or FIGURE 4.

I claim:

1. Dip transfer welding apparatus comprising; current source means connected to a welding head for supplying short circuit and arc current welding current thereto, pulse injecting means for supplying pulse of additional arc current to said welding head, trigger means for sensing the end of the period of short circuit current to actuate said pulse injecting means, and adjustable delay means included in said pulse injecting means for delaying the start of the injected current pulse for an adjustable time.

2. Welding apparatus as claimed in claim 1 wherein said trigger means comprises a resistor coupled in series with the welding head and a differentiator having an input connected across the resistor to respond to voltage developed there-across.

3. Welding apparatus as claimed in claim 2 wherein the pulse injecting means comprises a power source coupled to supply power to the welding head, a controllable gating means connected as a power switch between the power source and the welding head, and having a control input, the differentiator having an output coupled to said control input.

4. Welding apparatus as claimed in claim 3 wherein said power source means comprises a transformer including primary and secondary windings, the primary windings including an input connected to an alternating current line, and the secondary winding including an output connected to a rectifier means for rectifying the current to said gating means.

5. Welding apparatus as claimed in claim 4 wherein said secondary windings have tappings provided to vary the magnitude of the current supplied to said gating means.

6. Welding apparatus as claimed in claim 5 wherein said pulse injecting means further includes second controllable gating means, said second controllable gating means also coupled as a power switch between said power source and said welding head, and said second gating means further including a control input coupled to a variable time delay means whereby a control signal is applied to the second controllable gating means a preselected time after the commencement of said injected pulse to terminate said injected pulse.

7. A method of dip transfer welding, comprising feeding a consumable electrode toward a workpiece, supplying short circuit to heat said electrode while in contact with said workpiece, detecing the formation of an arc when the tip of said electrode melts off, supplying a pulse of current to said weld after the formation of said arc has been detected, and adjustably delaying the supply of said pulse.

8. A method of dip transfer welding as claimed in claim 7 further comprising adjusting the duration of said pulse of current supplied to said weld.

References Cited

UNITED STATES PATENTS

| | | | |
|---|---|---|---|
| 3,026,407 | 3/1962 | Bergmann | 219—131 |
| 3,275,797 | 9/1966 | Manz | 219—131 X |
| 3,345,552 | 10/1967 | Aldenhoff | 219—131 X |
| 3,249,735 | 5/1966 | Needham | 219—131 |

JOSEPH V. TRUHE, Primary Examiner

J. G. SMITH, Assistant Examiner

U.S. Cl. X.R.

219—137